United States Patent
Orlowski et al.

(10) Patent No.: US 10,715,073 B1
(45) Date of Patent: Jul. 14, 2020

(54) ROBOT ELECTRONICS UNIT (REU) MOTOR CONTROLLER BOARD (MCB)

(71) Applicant: United States of America as represented by the Administrator of NASA, Washington, DC (US)

(72) Inventors: Ireneusz Orlowski, Greenbelt, MD (US); Pietro A. Sparacino, Columbia, MD (US); Seshagiri Nadendla, Greenbelt, MD (US); Roger M. Chiei, Bethesda, MD (US); David J. Petrick, Severna Park, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/145,543

(22) Filed: Sep. 28, 2018

(51) Int. Cl.

| | |
|---|---|
| *H02P 23/00* | (2016.01) |
| *H02P 27/08* | (2006.01) |
| *H02K 11/21* | (2016.01) |
| *H02K 11/33* | (2016.01) |
| *H02K 11/35* | (2016.01) |
| *H02K 13/14* | (2006.01) |
| *H02K 17/12* | (2006.01) |
| *H02K 17/32* | (2006.01) |
| *H02K 24/00* | (2006.01) |

(Continued)

(52) U.S. Cl.
CPC .............. *H02P 27/08* (2013.01); *B25J 11/00* (2013.01); *B64G 4/00* (2013.01); *H02K 11/02* (2013.01); *H02K 11/21* (2016.01); *H02K 11/33* (2016.01); *H02K 11/35* (2016.01); *H02K 13/14* (2013.01); *H02K 17/12* (2013.01); *H02K 17/32* (2013.01); *H02K 24/00* (2013.01); *B25J 9/12* (2013.01); *B64G 1/1078* (2013.01); *B64G 2004/005* (2013.01); *H02K 2211/03* (2013.01); *H02P 2209/07* (2013.01)

(58) Field of Classification Search
CPC ........ H02P 6/00; H05K 1/181; G05B 19/4063
See application file for complete search history.

(56) References Cited

U.S. PATENT DOCUMENTS

| | | | | |
|---|---|---|---|---|
| 3,676,598 A | * | 7/1972 | Kurth ......................... | H04J 1/04 370/484 |
| 2015/0134165 A1 | * | 5/2015 | Biagini ..................... | B60L 1/14 701/22 |

FOREIGN PATENT DOCUMENTS

WO        WO-0128081 A2  *  4/2001   ................ H02P 6/00

* cited by examiner

*Primary Examiner* — Karen Masih
(74) *Attorney, Agent, or Firm* — Matthew F. Johnston; Bryan A. Geurts

(57) ABSTRACT

The present invention relates to a Robot Electronics Unit (REU) motor controller board (MCB) with a trapezoid wave design, which can utilize power efficiently and reduce electromagnetic interference. The MCB uses a modulator or Buck Converter to regulate the voltage before it is passed to the motors used in robotic arms in space applications. The REU MCB includes: a commutator disposed on the MCB and connected to a three-phase induction motor; and a modulator disposed on the MCB and which precedes the commutator, the modulator which utilizes pulse width modulation (PWM) to regulate a voltage to the commutator and provide a predetermined current to the commutator. The modulator regulates the voltage by stepping it down from a 100V power input signal before the voltage is passed to the motor. The output of the modulator includes a trapezoid waveform design which controls the motor and reduces electromagnetic interference.

18 Claims, 1 Drawing Sheet

(51) Int. Cl.
*B25J 11/00* (2006.01)
*B64G 4/00* (2006.01)
*H02K 11/02* (2016.01)
 B25J 9/12 (2006.01)
 B64G 1/10 (2006.01)

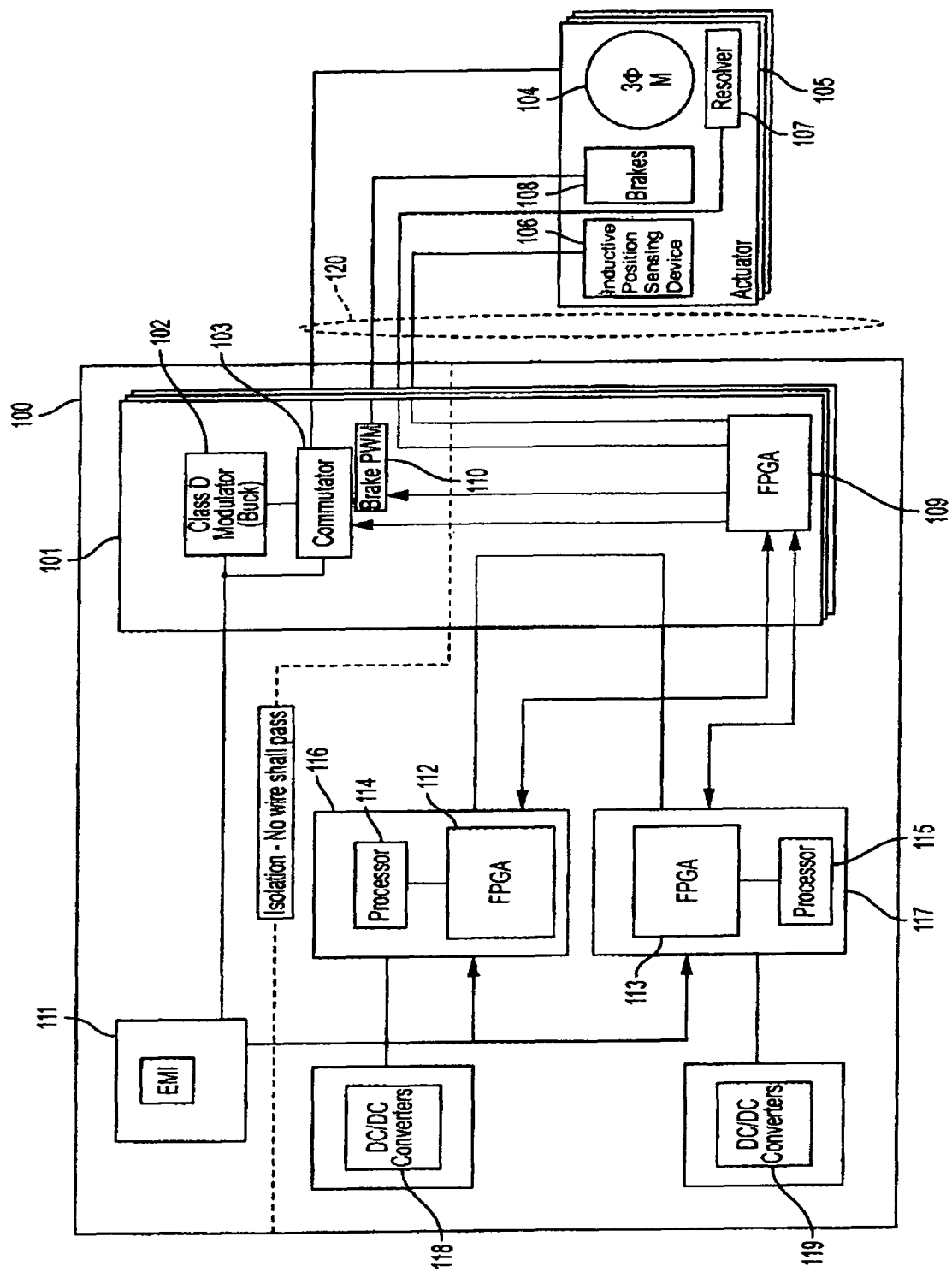

ROBOT ELECTRONICS UNIT (REU) MOTOR CONTROLLER BOARD (MCB)

ORIGIN OF THE INVENTION

The invention described herein was at least in-part made by an employee of the United States Government and may be manufactured or used by or for the Government of the United States of American for governmental purposes without the payment of any royalties thereon or therefor.

BACKGROUND OF THE INVENTION

1. Field of the Invention

The present invention relates to a Robot Electronics Unit (REU) motor controller board (MCB) with a trapezoid wave design, which can utilize power more efficiently and reduce electromagnetic interference (EMI) noise.

2. Description of the Related Art

The present invention relates to endeavors in space applications, such as launching a robotic spacecraft to refuel a live satellite. This satellite-servicing technology includes servicing satellites in low-Earth orbit. In addition, the present invention relates to technologies such as autonomous relative navigation systems with supporting avionics, and dexterous robotic arms and software, and a tool drive that supports a collection of sophisticated robotic tools for robotic spacecraft refueling, and a propellant transfer system.

In particular, the present invention is related to developing robotic arms for space applications. In robotic applications, the usual implementation of a three-phase motor drive creates radiated and conducted emissions as well as cross-talk to other sensitive control signals. The current designs operate at a much lower performance level because they utilize power inefficiently and require several strategies to reduce electromagnetic interference (EMI) noise.

Although space-flight-qualified technologies currently exist, current designs operate at a much lower performance level because they utilize power inefficiently and require several strategies to reduce EMI noise. More specifically, the usual implementation of a three-phase motor drive is to apply direct current (DC) bus voltage to a set of three full-bridge totem pole metal-oxide-semiconductor field-effect transistor (MOSFET) drivers. The power MOSFETs are switched ON and OFF sequentially in order to achieve the proper commutation sequence to the windings of the motor; additionally, they are provided with pulse-with-modulation (PWM) to control the winding current and, thus, motor torque. Consequently, the full bus voltage square wave at the PWM frequency is applied to the windings of the motor. The inductance of the motor winding filters out the voltage ripple and only the average current flows through the motor winding.

This conventional implementation of a three-phase motor drive works very well in most applications and circumstances; however, in space applications the high-frequency, high-voltage waveforms are a source of radiated and conducted emissions as well as cross-talk to other sensitive control signals. While these issues can be mitigated by heavy shielding, in many cases and in specific applications, such as articulated Robot Arms used in space applications, heavy shielding is either not possible or not desirable for other reasons.

In those cases where heavy shielding cannot be used to mitigate emission and cross-talk issues, the usual response is to filter each of the three-phase outputs to remove most of the high frequencies. In practice, however, this results in large inductive and capacitive components added to each phase, requiring restive damping to reduce the effects of LC resonance.

Further, due to the parasitic capacitance associated with Robot Arms used in space applications, using traditional pulse width modulation (PWM) for controlling current delivered to the motor 104 causes inefficiencies and electromagnetic compatibility failures when the devices are tested per MIL-STD-461.

Accordingly, a new way of mitigating emission and cross-talk problems in three-phase motor drives, is needed—particularly for Robot Arms used in space applications.

SUMMARY OF THE INVENTION

The present invention relates to a Robot Electronics Unit (REU) motor controller board (MCB) with a trapezoid wave design for robotic applications, which can utilize power more efficiently and reduce electromagnetic interference (EMI) noise.

One of the advantages of the Robot Electronics Unit (REU) Motor Controller Board (MCB) design scheme of the present invention is the utilization of a Buck Converter to regulate the voltage before it is passed to the motor. Due to the parasitic capacitance associated with Robot Arms used in space applications, using traditional pulse width modulation (PWM) for controlling current delivered to the motor causes inefficiencies and electromagnetic compatibility failures when the devices are tested per MIL-STD-461.

The present invention is a novel implementation of a three-phase motor drive design that utilizes a Buck Converter to regulate the voltage before it is passed to the motors used in the Robot Arm which results in a more efficient use of power and EMI noise reductions. The REU MCB ("electronics board") of the present invention is a high-performance, all-in-one robot and tool controller, processing multiple sensor inputs to perform 1G and 0G velocity and step motor control in a low-power, compact system.

The present invention has applications for future motor control designs for Robot Arms used in space applications due to its power efficiency and EMI noise reduction.

In one embodiment, an electronics board has a motor controller board, the motor controller board including: a commutator which is disposed on the motor controller board and connected to a three-phase induction motor; a modulator disposed on the motor controller board and which precedes the commutator, the modulator which utilizes pulse width modulation (PWM) to regulate a voltage to the commutator and provide a predetermined current to the commutator.

In one embodiment, the modulator is a Class-D modulator or Buck Converter, the modulator which regulates the voltage before the voltage is passed to the three-phase induction motor.

In one embodiment, the modulator steps down the voltage of a 100V power input signal applied to the commutator.

In one embodiment, an output of the modulator can be operated at a high-frequency and is filtered.

In one embodiment, the output of the modulator includes a trapezoid waveform design used in robot arms in space applications.

In one embodiment, the three-phase induction motor is controlled by the trapezoid waveform design which reduces electromagnetic interference.

In one embodiment, the modulator controls motor current bandwidth and monitors motor current consumption to adjust a current to a target current.

In one embodiment, the commutator controls phase commutation of the motor independently of the modulator.

In one embodiment, the electronics board further includes: a radiation-hardened field-programmable gate array (FPGA) disposed on the motor controller board, the FPGA which controls the monitoring of the motor current consumption and a comparison with the target current.

In one embodiment, when the motor current consumption is lower than the target current, the FPGA increases an analog voltage output that is compared to a high frequency triangular wave; and when the motor current consumption is higher than the target current, the FPGA decreases the analog voltage output that is compared to the high frequency triangular wave.

In one embodiment, the electronics board further includes: an electromagnetic interference (EMI) suppression chip connected to the modulator to reduce EMI emissions.

In one embodiment, the electronics board further includes: a brake PWM disposed on the motor controller board, configured to control a brake of the three-phase conduction motor.

In one embodiment, the modulator, the commutator, the brake PWM, and the EMI suppression chip are isolated from any other electronics on the electronics unit.

In one embodiment, a method of reducing electromagnetic interference and power, includes: regulating a voltage to a three-phase induction motor by preceding a commutator which is connected to the three-phase induction motor, with a modulator which utilizes pulse width modulation (PWM) to regulate the voltage and provide a predetermined current to the commutator; wherein the modulator is a Class-D modulator or Buck Converter which steps down the voltage applied to the commutator.

In one embodiment, the voltage of a 100V power input signal is applied to the commutator.

In one embodiment, an output of the modulator can be operated at a high-frequency and is filtered.

In one embodiment, the output of the modulator includes a trapezoid waveform design used in robot arms in space applications; and the three-phase induction motor is controlled by the trapezoid waveform design which reduces electromagnetic interference.

In one embodiment, the commutator controls phase commutation of the motor independently of the modulator.

In one embodiment, the method of reducing electromagnetic interference and power further includes: monitoring motor current bandwidth and motor current consumption to adjust a current to a target current using said modulator; and controlling the monitoring of the motor current consumption and a comparison with the target current using a radiation-hardened field-programmable gate array (FPGA).

In one embodiment, the method further includes: increasing an analog voltage output that is compared to a high frequency triangular wave when the motor current consumption is lower than the target current; and decreasing the analog voltage output that is compared to a high frequency triangular wave when the motor current consumption is higher than the target current.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawing is only one exemplary embodiment of the disclosure and not to be considered as limiting in scope.

The FIGURE depicts an electronics layout of the Robot Electronics Unit including the Motor Controller Board (MCB), according to one embodiment consistent with the present invention.

DESCRIPTION OF THE INVENTION

The present invention relates to a Robot Electronics Unit (REU) motor controller board (MCB) with a trapezoid wave design for robotic applications, which can utilize power more efficiently and reduce electromagnetic interference (EMI) noise (see FIGURE).

In one embodiment, the Robot Electronics Unit (REU) 100 includes a motor controller board (MCB) 101 (see FIGURE), where the MCB 101 is a high-performance, all-in-one robot and tool controller that processes multiple sensor inputs to perform 1G and 0G velocity and step motor control in a low-power, compact system.

The present invention is a novel implementation of a three-phase motor drive design that utilizes the Buck Converter 102 to regulate the voltage before it is passed to the motors used in the Robot Arm which results in a more efficient use of power and electromagnetic interference (EMI) noise reductions.

In one embodiment, the Buck Converter 102—for example, a Class D modulator—is placed on the MCB 100 and precedes a three-phase motor commutator 103 for the three-phase (3φ) induction motor 104. In one embodiment of the present invention, the Buck Converter 102 utilizes pulse width modulation (PWM) to the bus voltage to provide the desired current to the commutator 103. In one embodiment, the structure of the Class-D modulator when used as a Buck Converter 102, is one that functions as a voltage regulator which delivers a constant DC voltage into a variable load. In one embodiment, the Buck Converter 102 actively steps down the DC Voltage level of the 100V power input signal applied to the 6-step commutation stage (see commutator 103). The Buck Converter 102 regulates the voltage before it is passed to the motor 104. The design of the present invention improves the underlying technology and working of the robotics electronics unit motor controller board.

In one embodiment, the PWM signal that regulates the voltage is created using a high-speed comparator (not shown) that compares a high frequency triangular wave with an analog voltage that represents the target current level. This generates a series of pulses where the duty cycle is directly proportional with the instantaneous value of the target current level. The comparator then drives a MOS gate driver (not shown) which in turn drives a pair of high-power switches (i.e., metallic-oxide-semiconductor field-effect-transistors (MOSFETS) (not shown). This encodes audio input into a pulse train using pulse width modulation (PWM) techniques and produces an amplified replica of the comparator's PWM signal. A train of square pulses of fixed amplitude are generated, but varying in width and separation, representing the amplitude variations of the analog input signal.

In one embodiment, the output of the Buck Converter 102 is used to gate the output transistors (MOSFETS—not shown) ON and OFF alternately. In one embodiment, the Buck Converter 102 requires keeping dead times (i.e., the period during a switching transition when both output MOSFETs are driven into Cut-Off Mode and both are "OFF"), and linear mode operation (state between Cut-Off Mode and Saturation Mode where the MOSFET is neither fully ON nor fully OFF) as short as possible to maintain an accurate low-distortion output signal. Class-D amplifiers (not shown) return energy back to the power supply (not shown) which stores it.

In one embodiment, the output of the Buck Converter 102 can be operated at a very high frequency and can be filtered as desired. A simple low-pass filter (not shown) is used to provide a path for the low frequencies of the audio signal, leaving the high-frequency pulses behind. Thus, the high frequencies can be removed at one place, at the output of the Buck Converter 102 where only the modulation frequencies are present, and the filter capacitor (not shown) is not subject to the motor commutation frequencies, thus, saving power.

In one embodiment, the REU MCB 101 trapezoid wave design output by the Buck Converter 102 has a distinct and proven purpose in Robot Arms used in space applications due to its efficient use of power and EMI noise reductions: the two problems that arise from the usual implementation of the three-phase motor 104 drive. Using trapezoidal motor drive output waveforms to control a three-phase motor 104 results in a more efficient use of power as well as reduced EMI noise on Robot Arms used in space applications.

In one embodiment, the trapezoidal waveform cycle includes six segments per phase: one rising edge, two high segments, one falling edge, and two low segments. Since the three-phase voltages are 120 degrees out of phase, together they have a low common mode voltage; thus, conducted and radiated emissions are substantially reduced when this waveform cycle is used to control a three-phase motor 104 on Robot Arms used in space applications. Conducted and radiated emissions are substantially reduced because the three-phase voltages are 120 degrees out of phase and, together, have a low common mode voltage.

In one embodiment, by applying a trapezoid wave form design to the present robot motor control design, thermal and EMI issues are reduced while simultaneously increasing power efficiency. The motor current control and the phase commutation are performed independently by the Buck Converter 102 and commutator 103, respectively. The Buck Converter 102 also controls the motor current bandwidth and is constantly monitoring motor current consumption and comparing it to a target current and adjusting the Buck Converter 102 accordingly.

In one embodiment, the motor 104 is part of an actuator system 105 which receives the control signal from the Buck Converter 102 to run the motor 104. The actuator system 105 includes an inductive position sensing device 106 (which works as a transformer using planner arrays of inductive windings), a resolver 107 (i.e., a rotary electrical transformer used for measuring degrees of rotation), and a brake 108 which is powered by the motor (i.e., which prevents the media from opening a valve). The brake 108 is controlled by a Brake PWM 110.

In one embodiment, a radiation-hardened field-programmable gate array (FPGA) 109 (for example, an RTAX200) is placed on the MCB 100, and which provides high performance and low-power consumption, particularly for space applications. The FPGA 109 monitors the motor current consumption and compares that with a current target that is sent from a higher-level control system (not shown). When the current consumption is lower than the current target, the FPGA 109 increases the analog voltage output that is compared to the high frequency triangular wave. When the current consumption is higher than the current target, the FPGA 109 decreases the analog voltage output that is compared to the high frequency triangular wave.

In one embodiment, an electromagnetic interference (EMI) suppression chip 111 is connected to the Buck Converter 102, to reduce EMI emissions. In one embodiment, the Buck Converter 102, commutator 103, brake PWM 110, and EMI 111, are isolated from the other electronics on the REU 100. This allows the higher power switching to be isolated from the digital electronics, which helps alleviate EMI problems caused by the physical interactions between high power switching and digital electronic switching.

In one embodiment, the REU 100 includes a pair of controller boards 116, 117 which have FPGAs 112, 113 and microprocessors (for example, Leon 32-bit CPU microprocessors) 114, 115, which are fully redundant in functionality. This redundancy will allow the system to be fully operational in the case of a failure of either controller board 116, 117. The controller board 116, 117 receives a stream of commands and disperses them to the appropriate controller board 116, 117.

In one embodiment, the REU 100 includes a pair of DC/DC converters 118, 119, respectively connected to the controller boards 116, 117, and which include power supplies for the spacecraft power systems, and DC motor drives. The input to a DC-DC converter 118, 119 is an unregulated DC voltage Vg. The converter produces a regulated output voltage V, having a magnitude (and possibly polarity) that differs from Vg. Pulse-width modulation (PWM) allows control and regulation of the total output voltage.

The present invention's REU MCB 101 with a trapezoid wave design for robotic applications, can utilize power more efficiently and reduce electromagnetic interference (EMI) noise. The MCB 101 trapezoid wave design of the present invention has applications for future motor control designs for Robot Arms used in space applications, and its efficient use of power improves maintenance, reliability, and safety of equipment used in space.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. An electronics board having a motor controller board, said motor controller board comprising:
   a commutator which is disposed on the motor controller board and connected to a three-phase induction motor; and
   a modulator disposed on the motor controller board and which precedes said commutator, said modulator which utilizes pulse width modulation (PWM) to regulate a voltage to said commutator and provide a predetermined current to said commutator; and
   wherein said modulator controls motor current bandwidth and monitors motor current consumption to adjust a current to a target current.

2. The electronics board of claim 1, wherein said modulator is a Class-D modulator or Buck Converter, said modulator which regulates said voltage before said voltage is passed to said three-phase induction motor.

3. The electronics board of claim 2, wherein said modulator steps down said voltage of a 100V power input signal applied to said commutator.

4. The electronics board of claim 3, wherein an output of said modulator can be operated at a high-frequency.

5. The electronics board of claim 4, wherein said output of said modulator includes a trapezoid waveform design.

6. The electronics board of claim 5, wherein said three-phase induction motor is controlled by said trapezoid waveform design which reduces electromagnetic interference.

7. The electronics board of claim 1, wherein said commutator controls phase commutation of said motor independently of said modulator.

8. The electronics board of claim 7, further comprising:
   a radiation-hardened field-programmable gate array (FPGA) disposed on said motor controller board, said FPGA which controls said monitoring of said motor current consumption and a comparison with said target current.

9. The electronics board of claim 8, wherein when said motor current consumption is lower than said target current, said FPGA increases an analog voltage output that is compared to a high frequency triangular wave; and
   wherein when said motor current consumption is higher than said target current, said FPGA decreases said analog voltage output that is compared to said high frequency triangular wave.

10. The electronics board of claim 9, further comprising:
    an electromagnetic interference (EMI) suppression chip connected to said modulator to reduce EMI emissions.

11. The electronics board of claim 10, further comprising:
    a brake PWM disposed on said motor controller board, configured to control a brake of said three-phase conduction motor.

12. The electronics board of claim 10, wherein said modulator, said commutator, said brake PWM, and said EMI suppression chip are isolated from any other electronics on the electronics unit.

13. A method of reducing electromagnetic interference and power, comprising:
    regulating a voltage to a three-phase induction motor by preceding a commutator which is connected to said three-phase induction motor, with a modulator which utilizes pulse width modulation (PWM) to regulate said voltage and provide a predetermined current to said commutator;
    wherein said modulator is a Class-D modulator or Buck Converter which steps down said voltage applied to said commutator; and wherein said commutator controls phase commutation of said motor independently of said modulator.

14. The method of claim 13, wherein said voltage of a 100V power input signal is applied to said commutator.

15. The method of claim 14, wherein an output of said modulator can be operated at a high-frequency.

16. The method of claim 15, wherein said output of said modulator includes a trapezoid waveform design used; and
    wherein said three-phase induction motor is controlled by said trapezoid waveform design which reduces electromagnetic interference.

17. The method of claim 13, further comprising:
    monitoring motor current bandwidth and motor current consumption to adjust a current to a target current using said modulator; and
    controlling said monitoring of said motor current consumption and a comparison with said target current using a radiation-hardened field-programmable gate array (FPGA).

18. The method of claim 17, further comprising:
    increasing an analog voltage output that is compared to a high frequency triangular wave when said motor current consumption is lower than said target current; and
    decreasing said analog voltage output that is compared to a high frequency triangular wave when said motor current consumption is higher than said target current.

* * * * *